US008224236B2

(12) United States Patent
Sukiasyan et al.

(10) Patent No.: US 8,224,236 B2
(45) Date of Patent: Jul. 17, 2012

(54) SYSTEM AND METHOD FOR SWITCHING AN ANTENNA IN A RELAY STATION

(75) Inventors: Aram Sukiasyan, Calgary (CA); Claude Edwin Bedard, Carstairs (CA); Chad Neil Gilbertson, Strathmore (CA)

(73) Assignee: Fujitsu Semiconductor Limited, Kanagawa (JP)

( * ) Notice: Subject to any disclaimer, the term of this patent is extended or adjusted under 35 U.S.C. 154(b) by 414 days.

(21) Appl. No.: 12/505,304

(22) Filed: Jul. 17, 2009

(65) Prior Publication Data
US 2011/0014864 A1 Jan. 20, 2011

(51) Int. Cl.
*H04B 7/14* (2006.01)
(52) U.S. Cl. ......... 455/7; 455/11.1; 455/13.3; 455/13.1; 455/575.7; 455/63.4; 370/315; 370/332
(58) Field of Classification Search ............. 455/7, 11.1, 455/13.1, 13.4, 101, 562.1, 575.7, 427, 25, 455/21, 15, 561, 454, 450, 422.1, 502, 412.1, 455/432.1, 426.2, 403, 13.3, 63.4; 370/315, 370/312, 352, 469, 332
See application file for complete search history.

(56) References Cited

U.S. PATENT DOCUMENTS

| | | | | |
|---|---|---|---|---|
| 4,901,307 A * | 2/1990 | Gilhousen et al. | ............ | 370/320 |
| 6,272,339 B1 * | 8/2001 | Wiedeman | ................ | 455/426.1 |
| 7,428,428 B2 * | 9/2008 | Wong et al. | ................ | 455/562.1 |
| 7,466,985 B1 * | 12/2008 | Handforth et al. | ............ | 455/454 |
| 7,817,967 B2 * | 10/2010 | Karabinis et al. | ............ | 455/101 |
| 2002/0132619 A1 * | 9/2002 | Wiedeman et al. | ............ | 455/427 |
| 2002/0146980 A1 * | 10/2002 | Solondz et al. | ................ | 455/21 |
| 2004/0196822 A1 * | 10/2004 | Proctor, Jr. | ................... | 370/349 |
| 2004/0204026 A1 * | 10/2004 | Steer et al. | ................ | 455/550.1 |
| 2008/0030400 A1 * | 2/2008 | Lee | .............................. | 342/155 |
| 2008/0274693 A1 * | 11/2008 | Seo et al. | ........................ | 455/25 |
| 2009/0075589 A1 * | 3/2009 | Giese | ............................. | 455/25 |
| 2010/0054171 A1 * | 3/2010 | Zhu et al. | ...................... | 370/315 |

* cited by examiner

*Primary Examiner* — Tan Trinh
(74) *Attorney, Agent, or Firm* — Baker Botts L.L.P.

(57) ABSTRACT

A relay station for use in a relay network may include an antenna, a radio, and an electronic circuit. The antenna may include a plurality of prongs. The radio may be configured to transmit and receive radio data using the antenna. The electronic circuit may be configured to select between a first mode of operation for the antenna and a second mode of operation for the antenna. The first mode of operation of the antenna may include an omni-directional mode of operation. The second mode of operation may include a directional mode of operation.

16 Claims, 4 Drawing Sheets

SYSTEM AND METHOD FOR SWITCHING AN ANTENNA IN A RELAY STATION

TECHNICAL FIELD OF THE INVENTION

This invention relates in general to antennae and, more particularly, to a system and method for switching an antenna in a relay station.

BACKGROUND

While broadband network services and Voice over IP (VoIP) products continue to grow and expand, so does the demand for wireless network functionality. To help meet this demand, networks are being developed that use multiple base stations (BSs), relay stations (RSs), access points or other points of contact. In many scenarios the various BSs, RSs, access points or other points of contact communicate with one another via wireless channels.

One emerging wireless technology is IEEE 802.16 (including 802.16j and 802.16m), popularly known as WiMAX. WiMAX provides broadband wireless access, with a single BS providing coverage over a large area (theoretically up to 31 miles). Other wireless networking technologies include Third Generation (3G), Third Generation Partnership Project (3GPP), and IEEE 802.11, popularly known as WiFi.

In networks using any of these technologies, the coverage area of a cell (the area controlled by a particular BS) may be extended and the system capacity enhanced through the use of RSs. RSs may be functionally placed between a BS and a user or mobile station (MS). As placed the RS may relay data and control packets between the MS and the BS. The RS may also be connected to other RSs for further extending the coverage area or enchanting the system capacity. In general, downstream communication refers to communication from the BS to the end user or MS and upstream communication refers to communication from an end user or MS to the BS.

SUMMARY

In accordance with a particular embodiment, a relay station for use in a relay network may include an antenna, a radio, a processor, and an electronic circuit. The antenna may include a plurality of prongs. The radio may be configured to transmit and receive radio data using the antenna. The electronic circuit may be configured to select between a first mode of operation for the antenna and a second mode of operation for the antenna. The first mode of operation of the antenna may include an omni-directional mode of operation. The second mode of operation may include a directional mode of operation.

In accordance with another embodiment, a multi-hop relay network may include a base station, an endpoint, and a relay station. The endpoint may be configured for wireless communication with the base station. The relay station may be configured to transmit wireless communication between the base station and the endpoint. The relay station may include an antenna, a radio, and an electronic circuit. The antenna may include a plurality of prongs. The radio may be configured to transmit and receive radio data using the antenna. The electronic circuit may be configured to select between a first mode of operation for the antenna and a second mode of operation for the antenna. The first mode of operation of the antenna may include an omni-directional mode of operation. The second mode of operation may include a directional mode of operation.

In accordance with another embodiment, a method for operation of a relay station in a multi-hop relay network may include selecting a first mode of operation for an antenna, communicating radio signals between the relay station and an endpoint using the first mode of operation, selecting a second mode of operation for the antenna, and communicating radio signals between the relay station and a base station using the second mode of operation. The first mode of operation may include an omni-directional mode of operation. The second mode of operation may include a directional mode of operation.

These and other embodiments may provide one or more advantages in comparison to prior art relay stations. For example, the teachings of the present disclosure may allow for greater distance between a base station and a relay station in comparison to relay stations with a single, omni-directional antenna for both upstream and downstream communication. As another example, use of one prong of an omni-directional antenna for communication with the BS may reduce the complication of installation in comparison to an RS using a directional antenna for communication with the BS (e.g., a narrow band directional antenna must be carefully aligned and reinstalled any time the RS moves).

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of particular embodiments and their advantages, reference is now made to the following description, taken in conjunction with the accompanying drawings, in which.

DETAILED DESCRIPTION

Figure 1:
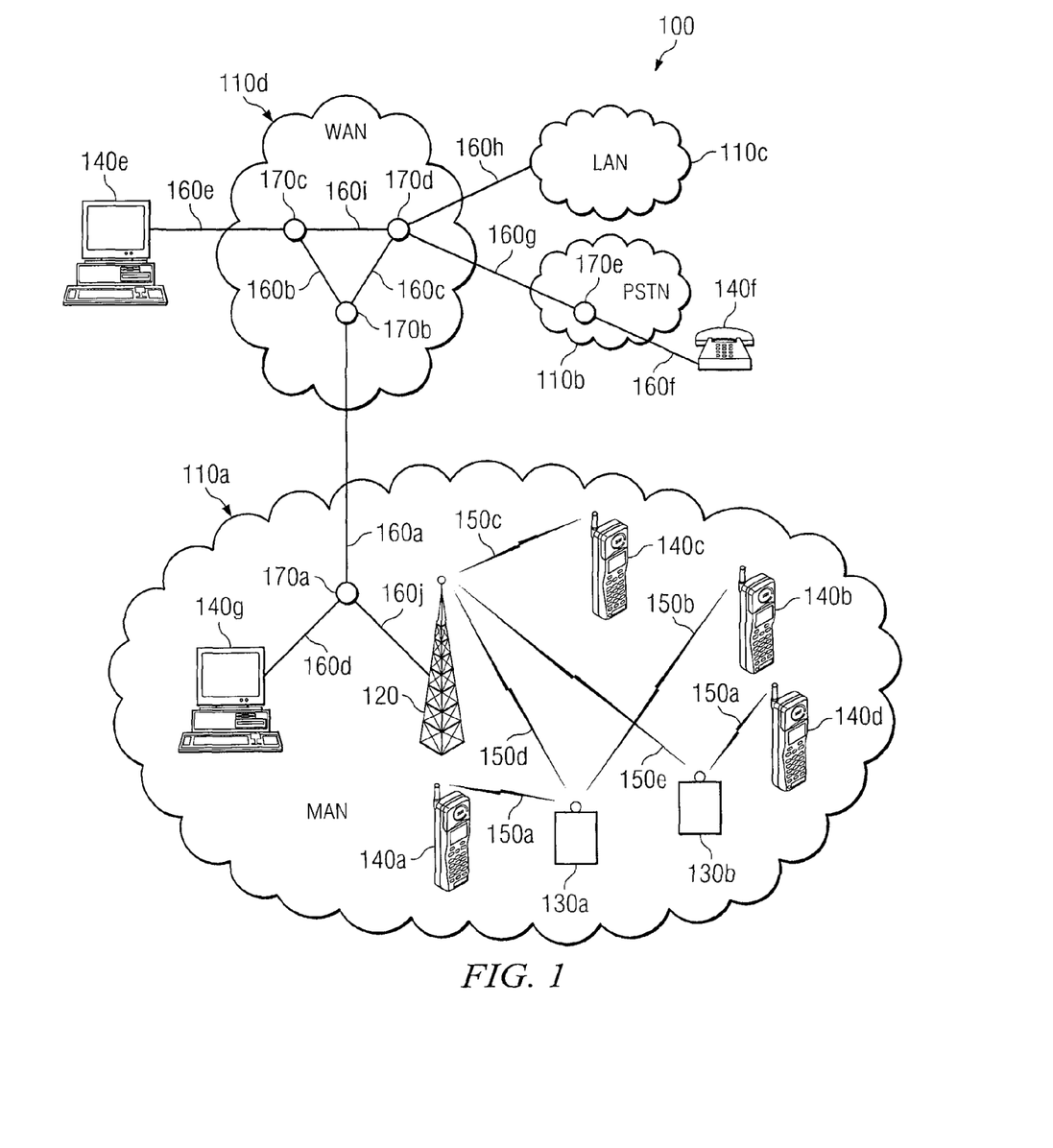
FIG. 1 illustrates a communication system comprising various communication networks, in accordance with teachings of the present disclosure.

FIG. 1 illustrates an example communication system comprising various communication networks, in accordance with teachings of the present disclosure. Communication system 100 may be comprised of multiple networks 110. Each network 110 may be any of a variety of communication networks designed to facilitate one or more different services either independently or in conjunction with other networks. For example, networks 110 may facilitate internet access, online gaming, file sharing, peer-to-peer file sharing (P2P), voice over internet protocol (VoIP) calls, video over IP calls, or any other type of functionality typically provided by a network. Networks 110 may provide their respective services using any of a variety of protocols for either wired or wireless communication. For example, network 110a may comprise an 802.16 wireless network (e.g., 802.16m), popularly known as WiMAX, which may include base stations, such as base station 120, and relay stations, such as relay stations 130. Network 110a may provide for the use of relay stations 130 by implementing 802.16j. A WiMAX network that uses relay stations may be referred to as a mobile multi-hop relay (MMR) network.

Within a network using a wireless protocol (e.g., 802.16m), such as network 110a, particular embodiments may allow for endpoints 140 to decide whether to connect to base station 120 or one of relay stations 130. In some embodiments this decision may be based on the spectrum efficiency of the single-hop access link (e.g., link 150c between base station 120 and endpoint 140c), the multi-hop access link (e.g., link 150a between relay station 130a and endpoint 140a), and the relay link (e.g., link 150d between relay station 130a and base station 120).

In some embodiments the quality of the access link (e.g., link 150a or 150c) may need to be above a certain threshold before the endpoint will connect to the respective access station (e.g., base station 120 or relay station 130). As may be apparent, if an endpoint only detects a single link, whether with the base station or the relay station, satisfying this minimal spectrum efficiency requirement, it will connect to this access station since this is the only choice. However, in particular embodiments, if the endpoint finds multiple base stations or relay stations available, it may determine which access station to connect with by comparing the effective spectrum efficiencies of the respective access stations.

In some embodiments, spectrum efficiency may be compared in terms of Received Signal Strength Indicators (RSSI). RSSI refers to a measurement of the power present in a radio signal received. In particular embodiments, spectrum efficiency may be determined by the maximal usable modulation and coding scheme (MCS) level that can be used on the respective wireless connection. This may be determined by the Carrier to Interference-plus-Noise Ratio (CINR) of the wireless connection and may be measured in units of bits/Hz/sec. For example, a Quadrature Phase-Shift Keying (QPSK) modulated signal with code rate ½, may have a spectrum efficiency of 1 bit/Hz/sec.

Between each relay station and/or base station there may be a wireless connection or link, such as wireless connection 150d. As mentioned above, this wireless connection may be referred to as a relay link because it connects the base station with the relay station. A link may comprise various wireless resources such as, for example, a combination of a particular center frequency, a particular bandwidth, a particular time slot, and/or a particular subchannel (for example, as described in a downlink or uplink map). In particular embodiments, it may be convenient to discuss the amount of resources used by a link in terms of slots. Depending on the embodiment, a slot may comprise a particular number of subchannels and symbols (also known as time slots). For example, Section 8.4.3.1 in the Institute of Electrical & Electronics Engineers (IEEE) 802.16e-2005 Standard specifies a slot comprising a single subchannel and two symbols.

An increase in the number of wireless connections 150 may increase the impact and severity of interference between wireless connections 150. In particular embodiments, uplink sounding may be used to estimate the channel gain and interference strength between multiple relay stations 130 and base station 150. The uplink sounding may, therefore, be used in determining the quality and/or efficiency of the various wireless connections.

Although communication system 100 includes four different types of networks, networks 110a-110d, the term "network" should be interpreted as generally defining any network or combination of networks capable of transmitting signals, data, and/or messages, including signals, data or messages transmitted through WebPages, e-mail, text chat, voice over IP (VoIP), and instant messaging. Depending on the scope, size and/or configuration of the network, any one of networks 110a-110d may be implemented as a LAN, WAN, MAN, PSTN, WIMAX network, global distributed network such as the Internet, Intranet, Extranet, or any other form of wireless or wired networking.

Generally, networks 110a, 110c, and 110d provide for the communication of packets, cells, frames, or other portions of information (generally referred to as packets herein) between endpoints 140 and/or nodes 170. Networks 110 may include any number and combination of wired links 160, wireless connections 150, nodes 170 and/or endpoints 140. For purposes of illustration and simplicity, network 110a is a MAN that may be implemented, at least in part, via WiMAX, network 110b is a PSTN, network 110c is a LAN, and network 110d is a WAN.

In particular embodiments, networks 110a, 110c and 110d may be IP networks. IP networks transmit data by placing the data in packets and sending each packet individually to the selected destination, along one or more communication paths. Network 110b may, for example, be a PSTN that may include switching stations, central offices, mobile telephone switching offices, pager switching offices, remote terminals, and other related telecommunications equipment that are located throughout the world. Network 110d may be coupled to network 110b through a gateway. Depending on the embodiment, the gateway may be a part of network 110b or 110d (e.g., nodes 170e or 170c may comprise a gateway). The gateway may allow PSTN 110d to be able to communicate with non-PSTN networks such as networks 110a, 110c and 110d.

Any of networks 110a, 110c or 110d may be coupled to other IP networks including, but not limited to, the Internet. Because IP networks share a common method of transmitting data, signals may be transmitted between devices located on different, but interconnected, IP networks. In addition to being coupled to other IP networks, any of networks 110a, 110c or 110d may also be coupled to non-IP networks through the use of interfaces or components such as gateways.

Networks 110 may be connected to each other and with other networks via a plurality of wired links 160, wireless connections 150, and nodes 170. Not only do the wired links 160, wireless connections 150, and nodes 170 connect various networks but they also interconnect endpoints 140 with one another and with any other components coupled to or a part of any of networks 110. The interconnection of networks 110a-110d may enable endpoints 140 to communicate data and control signaling between each other as well as allowing any intermediary components or devices to communicate data and control signals. Accordingly, users of endpoints 140, may be able to send and receive data and control signals between and among each network component coupled to one or more of networks 110a-110d.

As noted above, wireless connections 150 may represent a wireless link between two components using, for example, WiMAX. The extended range of a WiMAX base station and/or relay station may allow network 110a to cover the larger geographic area associated with a MAN while using a relatively small number of wired links. More specifically, by properly arranging base station 120 and multiple relay stations 130 around a metropolitan area, the multiple relay stations 130 may use wireless connections 150 to communicate with base station 120 and wireless endpoints 140 throughout the metropolitan area. Then base station 120 may, through wired connection 160a, communicate with other base stations, network components not capable of establishing a wireless connection, and/or other networks outside of the MAN, such as network 110d or the Internet.

Nodes 170 may include any combination of network components, session border controllers, gatekeepers, base stations, conference bridges, routers, hubs, switches, gateways, endpoints, or any other hardware, software, or embedded logic implementing any number of communication protocols that allow for the exchange of packets in communication system 100. For example, node 170a may comprise another base station that is wired to base station 120 via link 160j and to network 110d via link 160a. As a base station, node 170a may be able to establish several wireless connections with various other base stations, relay stations, and/or endpoints. As another example, node 170e may comprise a gateway. This may allow network 110b, a PSTN network, to be able to transmit and receive communications from other non-PSTN networks, such as network 110d, an IP network. Node 170e, as a gateway, works to translate communications between the various protocols used by different networks.

Endpoints 140 and/or nodes 170 may provide data or network services to a user through any combination of hardware, software embedded in a computer readable medium, and/or encoded logic incorporated in hardware or otherwise stored (e.g., firmware). For example, endpoints 140a-140d may include a cell phone, an IP telephone, a computer, a video monitor, a camera, a personal data assistant or any other hardware, software and/or encoded logic that supports the communication of packets (or frames) using networks 110. Endpoints 140 may also include unattended or automated systems, gateways, other intermediate components or other devices that can send or receive data and/or signals.

Although FIG. 1 illustrates a particular number and configuration of endpoints, connections, links, and nodes, communication system 100 contemplates any number or arrangement of such components for communicating data. In addition, elements of communication system 100 may include components centrally located (local) with respect to one another or distributed throughout communication system 100.

Figure 2:
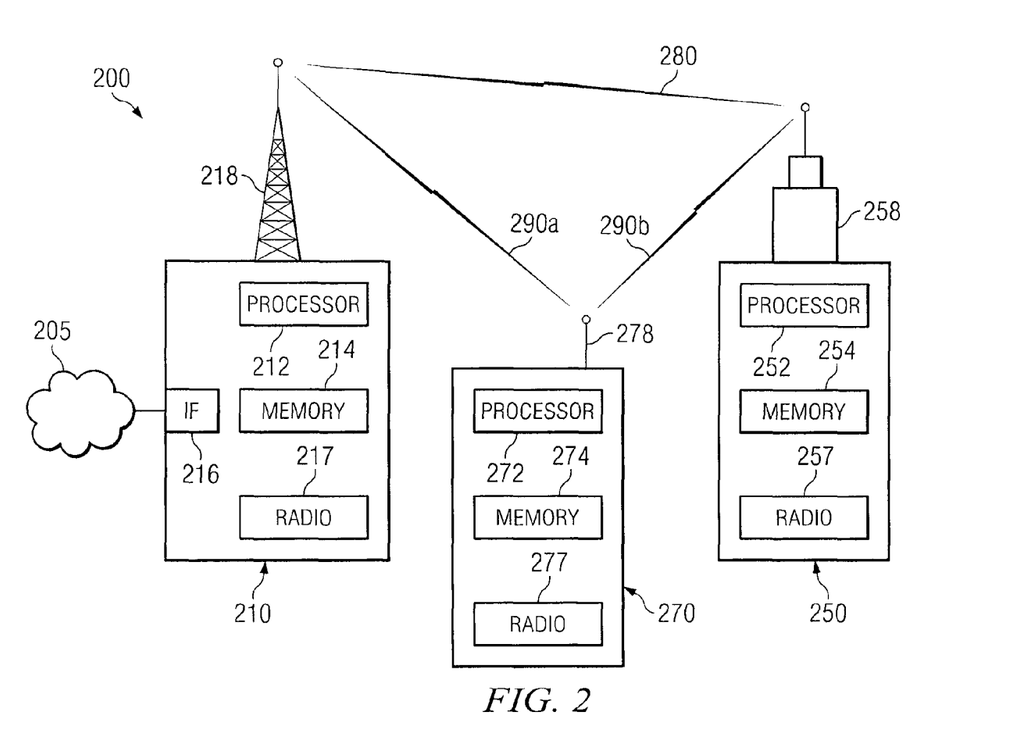
FIG. 2 illustrates a wireless network comprising a more detailed view of an endpoint, a base station and a relay station, in accordance with teachings of the present disclosure.

FIG. 2 illustrates an example wireless network comprising a more detailed view of an endpoint, a base station and a relay station, in accordance with teachings of the present disclosure. More specifically, the depicted embodiment is a simplified network comprising network 205, base station 210, relay station 250 and endpoint 270. In different embodiments network 200 may comprise any number of wired or wireless networks, base stations, endpoints, relay stations, and/or any other components that may facilitate or participate in the communication of data and/or signals whether via wired or wireless connections. Base station 210 as shown comprises processor 212, memory 214, interface 216, radio 217 and antenna 218. Similarly, relay station 250 and endpoint 270 as shown comprise processors 252 and 272, memory modules 254 and 274, radios 257 and 277, and antennas 258 and 278. These components may work together in order to provide wireless networking functionality, such as providing wireless connections in a wireless network (e.g., a WiMAX wireless network).

Network 205 may comprise one or more of the networks described above with respect to FIG. 1. For example, network 205 may comprise the Internet, a LAN, WAN, MAN, PSTN or some combination of the above.

Processors 212, 252 and 272 may be microprocessors, controllers, or any other suitable computing devices, resources, or combinations of hardware, software and/or encoded logic operable to provide, either alone or in conjunction with other components, (e.g., memory 214, 254, and/or 274) wireless networking functionality. Such functionality may include providing various wireless features discussed herein. For example, processors 212, 252 and 272 may be able to determine the spectrum efficiency of one or more of wireless connections 280 and 290. Additional examples and functionality provided, at least in part, by processors 212, 252 and 272 will be discussed below.

Memory modules 214, 254, and 274 may be any form of volatile or non-volatile memory including, without limitation, magnetic media, optical media, random access memory (RAM), read-only memory (ROM), flash memory, removable media, or any other suitable local or remote memory component or components. Memory modules 214, 254, and 274 may store any suitable data or information utilized by base station 210, relay station 250, and endpoint 270, respectively, including software embedded in a computer readable medium, and/or encoded logic incorporated in hardware or otherwise stored (e.g., firmware).

For example, in particular embodiments memory modules 214, 254, and 274 may store information regarding the spectrum efficiency of one or more particular links. Memory modules 214, 254, and 274 may also maintain a list, database, or other organization of data useful for determining how to route data to the proper component. For example, in some embodiments a tree structure (as opposed to a mesh structure) may be used in routing data from an endpoint to a base station. More specifically, there may be a known path from base station 210 to endpoint 270b. This path, or a portion thereof, may be stored in one or more of memory modules 214, 254, and 274.

Radios 217, 257, and 277 may be coupled to or a part of antennas 218, 258, and 278, respectively. Radios 217, 257, and 277 may receive digital data that is to be sent out to other base stations, relay stations and/or endpoints via a wireless connection. Radios 217, 257, and 277 may convert the digital data into a radio signal having the appropriate center frequency and bandwidth parameters. These parameters may have been determined ahead, for example by a combination of processor 212 and memory 214 of base station 210. The radio signal may then be transmitted via antennas 218, 258, and 278 to the appropriate recipient. Similarly, radios 217, 257, and 277 may convert radio signals received via antennas 218, 258, and 278, respectively, into digital data to be processed by processor 212, 252, or 272, as appropriate.

Antennas 218, 258, and 278 may be any type of antenna capable of transmitting and receiving data and/or signals wirelessly. In some embodiments, antennas 218, 258, and 278 may comprise one or more omni-directional, sector or panel antennas operable to transmit/receive radio signals between 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. Together, radio 217 and antenna 218, radio 257 and antenna 258, and radio 277 and antenna 278 may each form a wireless interface.

Base station 210 also comprises interface 216 which may be used for the wired communication of signaling and/or data between base station 210 and network 205. For example, interface 216 may perform any formatting or translating that may be needed to allow base station 210 to send and receive data from network 205 over a wired connection. While not depicted, relay station 250 and endpoint 270 may also include wired interfaces.

Relay stations 250 may, in essence, be smart repeaters between base station 210 and endpoint 270. Depending on the embodiment and configuration of a relay station, one or more of relay stations 250 may be transparent or non-transparent. From the perspective of an endpoint, a transparent relay station is perceived as though the endpoint were communicating with base station 210 while a non-transparent relay station is perceived as though it were another base station.

Endpoints 270 may be any type of wireless endpoints able to send and receive data and/or signals to and from base station 210 or relay stations 250. Some possible types of endpoints 270 may include desktop computers, PDAs, cell phones, laptops, and/or VoIP phones.

As discussed above, in particular embodiments it may be desirable for endpoint 270 to use its radio 277/antenna 278 interface to connect to the access link 290 having the greatest spectrum efficiency. However, in order for the spectrum efficiency of each access link to be properly compared, processor 272 may need to account for the efficiency of any relay links 280 between relay station 250 and base station 210. Thus, in those embodiments using in-band relaying, the effective spectrum efficiency of an access link 290 includes the efficiency of the access link as well as any preceding relay links between the access point (the relay station to which the endpoint is connected) and the base station. As discussed above the spectrum efficiency of a link may be determined by processors 252 and/or 272 of relay station 250 and/or endpoint 270 through measuring the link qualities (CINRs) of the respective link.

The following example, in connection with FIG. 2, may help to better understand how the various components of relay station 250 may work in a particular situation. For purposes of this example, it may be assumed that relay station 250 has established relay link 280 with base station 210 and access link 290b with endpoint 270. Furthermore, in this example, it may be assumed that a frame structure is used in which each frame may be divided into an uplink sub-frame and a downlink sub-frame. During the downlink sub-frame base station 210 may transmit information to both relay station 250 and endpoint 270.

More specifically, a first zone may be used by base station 210 to deliver data to relay station 250 (e.g., data for endpoint 270) and a second zone may be used to deliver data to endpoint 270 (in some embodiments, data may be delivered to endpoints connected directly to base station 210 during both zones). The zones may be within the downlink sub-frame. A third zone may be used to receive data from relay station 250 and a fourth zone may be used to receive data from endpoint 270 (in some embodiments, data may be received from endpoints connected directly to base station 210 during both zones 326 and 328). The third and fourth zones may both be within the uplink sub-frame.

The frame structure for base station 210 may comply with the wireless standard being used by network 200 (e.g., the IEEE 802.16e standard). In particular embodiments, it may be desirable for base station 210 to schedule all the traffic with relay station 250 (e.g., the traffic to/from endpoint 270) to occur during the first and third zones at the beginning of each sub-frame. The frame structure described, and others sharing some of these features, may provide a protocol for managing upstream and downstream traffic through a single relay station (e.g., relay station 250).

Thus far several different embodiments and features have been presented. Particular embodiments may combine one or more of these features depending on operational needs and/or component limitations. This may allow for great adaptability of network 200 to the needs of various organizations and users. For example, a particular embodiment may use several base stations to provide wireless access for a metropolitan area, or a single base station may be used with several relay stations to provide the necessary coverage. Furthermore, in some embodiments, relay station 250 may have more or less radios. Some embodiments may include additional features.

Figure 3:
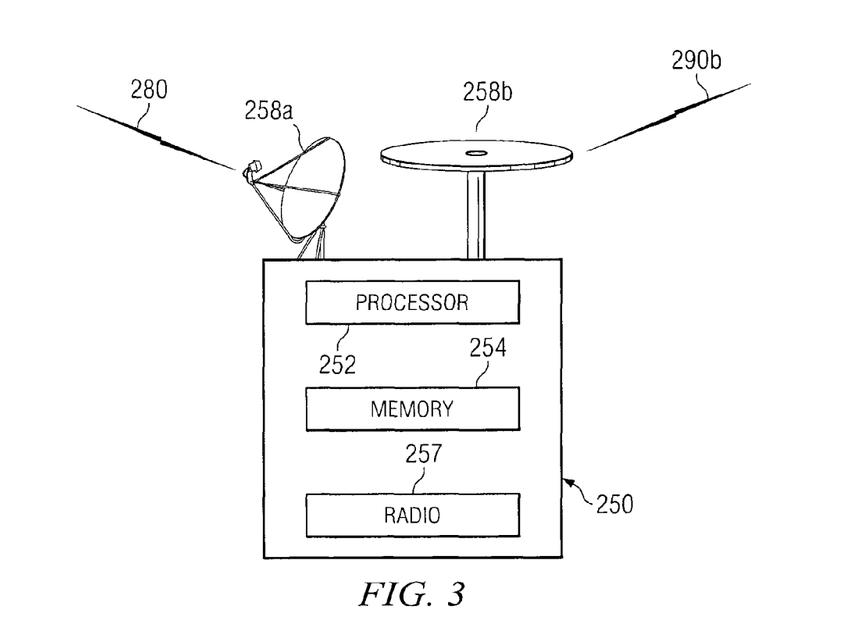
FIG. 3 illustrates a relay station that may be used in a wireless network.

FIG. 3 illustrates one example configuration of relay station 250. As shown in FIG. 3, antenna 258 may include two separate antennae, antenna 258a configured to communicate with base station 210 and antenna 258b configured to communicate with one or more mobile stations. Antenna 258a may be a "directional antenna" or "beam antenna." A directional antenna is configured to radiate power in one or more specific directions and/or areas (e.g., a sector antenna, and/or a panel antenna). A directional antenna may provide increased performance and/or reduced interference over a longer distance than a normal antenna. Antenna 258a may include any form of directional antenna (e.g., a venturi antenna, a yagi antenna, a log-periodic antenna, a corner reflector, etc.). Use of a directional antenna for transmitting and/or receiving over relay links 280 may allow relay station 250 to be located a greater distance from base station 210. A directional antenna, however, typically requires skilled installation to insure the antenna is properly aimed. In communication system 200, any time relay station 250 is moved, antenna 258 might require additional skilled adjustment and/or installation.

Figure 4:
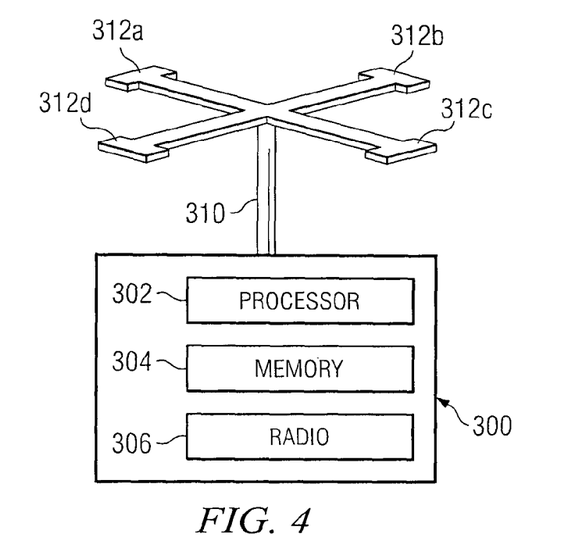
FIG. 4 illustrates a relay station that may be used in a wireless network, in accordance with teachings of the present disclosure.

FIG. 4 illustrates an example relay station 300 for use in accordance with the teachings of the present disclosure. Relay station 300 may include processor 302, memory 304, radio 306, and antenna 310. Processor 302, memory 304, and radio 306 may be similar to processor 272, memory 274, and radio 277 as described in relation to FIG. 2.

Antenna 310 may include four prongs 312a, 312b, 312c, and 312d. Each respective prong 312 may be configured to cover approximately 90 degrees of scope. Prongs 312 may include any type of antenna appropriate for a network. For example, prongs 312 may include panel antennas, transmit antennas, parabolic antennas, etc.

In operation, if all four prongs 312a, b, c, and d are powered, antenna 310 may provide 360 degree coverage. It should be noted, however, that antenna 310 may include a larger or smaller number of prongs 312 with corresponding scopes of coverage for each prong 312. In addition, each prong 312 may provide a scope of coverage that overlaps with the prongs on either side (e.g., to provide a complete range of coverage, to provide redundancy, to provide a safety factor, and/or a variety of other reasons). A full 360 degree scope of coverage may be used to search for mobile end points 270 and/or to maintain coverage as one or more mobile end points 270 moves within the coverage area of relay station 300.

Antenna 310 may also be operated in a directional mode to facilitate communication between BS 210 and RS 300. In one example of a directional mode, prong 312a may be the only prong 312 communicating with radio 306. If prong 312a is the only prong 312 communicating with radio 306, relay station 300 may be located a greater distance from base station 210 than a relay station using only an omni-directional antenna. Increasing the number of prongs 312 may allow each prong 312 to communicate over a greater distance because prong 312 is focused on a narrower sector. This increase in distance may be offset, however, by increasing complexity in switching between prongs 312 and/or increased noise between antenna 310 and processor 302.

In some embodiments, relay station 300 may be configured to automatically determine which prong 312 of antenna 310 to use for communicating with a base station, such as base station 210. In one example, relay station may test each prong 312 to determine which provides a relay link, such as relay link 280 the greatest spectrum efficiency. As discussed above, the spectrum efficiency of a link may be determined by processor 302 of relay station 300 through measuring the link qualities (CINRs) of the signals received via respective prong 312.

Those embodiments of relay station 300 configured to automatically select among prongs 312 may benefit from reflected signals and/or additional relay stations 250 to boost the spectrum efficiency in comparison to those relay stations using directional antenna confined to straight line-of-sight communication with base station 210. In addition, the teachings of the present disclosure may require less precise installation in comparison to those relay stations using directional antenna confined to straight line-of-sight communication with base station 210. As another example, those embodiments of relay station 300 configured to automatically select among prongs 312 may benefit from increased signal strength in comparison to a RS using an omni-directional antenna to communicate with a BS.

Figure 5:
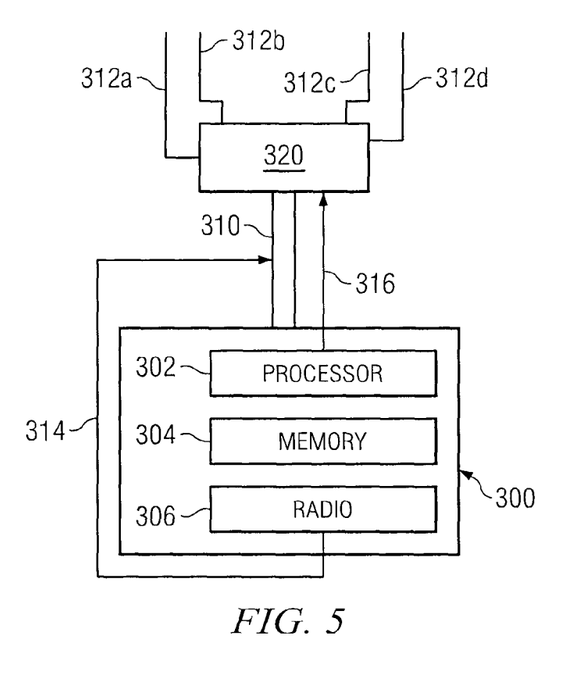
FIG. 5 illustrates a block diagram of an electrical circuit that may be used with a relay station in accordance with teachings of the present disclosure.

FIG. 5 illustrates an example electrical system that might be used in the operation of antenna 310 as described in relation to FIG. 4. In the embodiment shown in FIG. 5, radio 314 may provide communication signal 314 to antenna 310. In receiving mode, radio 314 may receive communication signal 314 from antenna 310. Different network protocols may provide specific requirements for upstream and downstream communication. For example, some protocols may provide a pre-determined time window for upstream communications and a second pre-determined time window for downstream communications.

Relay station 300 may include switch 320. Switch 320 may include one or more electrical components operable to connect or break an electrical circuit (e.g., interrupting an electrical current and/or diverting is from one conductor to another). Processor 302 may be configured to operate switch 320 in accordance with teachings of the present disclosure.

For example, while broadcasting, processor 302 may operate switch 320 using signal 316 to select between omni-directional operation and directional operation of antenna 310. In omni-directional mode, switch 320 may be configured to direct communication signal 314 to all four prongs 312a, 312b, 312c, and 312d of antenna 310. In directional mode, switch 320 may be configured to direct communication signal 314 to any one of prongs 312a, 312b, 312c, and 312d. Switch 320 may be used to switch between omni-directional and directional modes while receiving communications as well.

Persons having ordinary skill in the art will be able to design many varieties of electronic circuitry operable to switch antenna 310 between single directional use and omni-directional use. For example, any type of radio frequency (RF) switch may be used. Solid state RF switches may provide faster switching speed, increased reliability and/or durability, and/or increased stability and/or repeatability than electromechanical RF switches. On the other hand, electromechanical switches may provide better insertion losses, power handling, and/or isolation specifications. Some new-generation microelectromechanical system (MEMS) RF switches combine benefits from both electromechanical and solid state switches.

Figure 6:
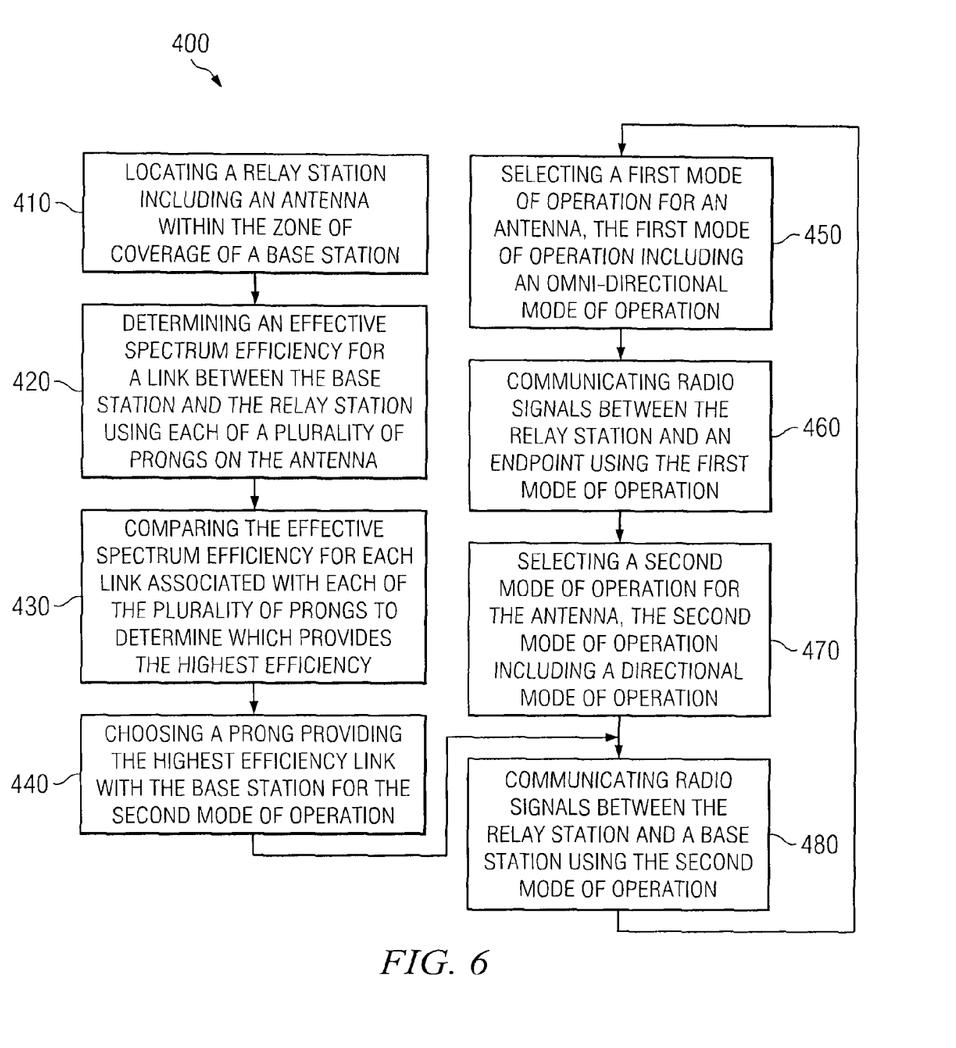
FIG. 6 illustrates a method for operation of a relay station in a multi-hop network, in accordance with teachings of the present disclosure.

FIG. 6 is a flowchart illustrating a method 400 for use of a switchable antenna in a relay station according to teachings of the present disclosure.

Step 410 includes locating relay station 300 within the zone of coverage of a base station. Step 410 may be performed during initial deployment of a multi-hop network and/or at any time a relay station moves. As another example, step 410 may be performed if a base station goes off-line, is replaced, and/or is altered. Relay station 300 may be within the zone of coverage of more than one base station. As another example, relay station 300 may be placed in series with additional relay stations to expand the range of coverage of a base station.

Step 420 includes determining an effective spectrum efficiency for a link between the base station and relay station 300 using the plurality of prongs 312 associated with antenna 310. As described in relation to FIG. 4, the strongest signal link between relay station 300 and a base station may be determined by effective spectrum efficiency, or, in some embodiments, CNRI and/or RSSI. Step 420 may include testing the effective spectrum efficiency for a link using each prong 312 (e.g., 312a, 312b, 312c, and 312d). Step 420 may be performed upon initial deployment of relay station 300, at set intervals of time (e.g., every hour, once a week, etc.).

Step 430 includes comparing the effective spectrum efficiency for each link tested in step 420 to determine which prong 312 of antenna 310 provides the most efficient link. Step 430 may include comparing the effective spectrum efficiency (or CNRI and/or RSSI as discussed above) for one link for each prong 312 on antenna 310. Relay station 300 may perform step 430 each time it communicates with base station 210, once per day, upon initial deployment, and/or at any other appropriate interval.

Step 440 includes choosing a prong with the highest efficiency value for use in a directional mode of operation. Relay station 300 may use the prong selected at step 440 for communication with base station 210 as previously discussed. Selection of a single prong may provide increased signal strength and/or the ability to increase the distance between base station 210 and relay station 300 in comparison to an omni-directional antenna. Use of antenna 310 may provide simplified deployment in comparison to a relay station with separate antennas for directional (e.g., communication with base station 210) and omni-directional (e.g., communication with end point 270) modes.

The combination of steps 420, 430, and 440 may be performed repeatedly as appropriate in method 400. For example, these steps may be performed once upon deployment (e.g., immediately after step 410). As another example, these steps may be performed at a pre-determined time interval (e.g., once a day and/or another frequency). As another example, these steps may be performed upon a pre-determined event (e.g., every time a second mode of operation is selected at step 470).

Step 450 includes selecting a first mode of operation for antenna 310, the first mode of operation including an omni-directional mode of operation. The first mode of operation may be appropriate for communication with mobile endpoint 270.

Step 460 includes communicating radio signals between relay station 300 and endpoint 270 using the first mode of operation.

Step 470 includes selecting a second mode of operation for the antenna, the second mode of operation including a directional mode of operation. The second mode of operation may be appropriate for communicate with base station 210, another relay station 300, and/or a fixed endpoint 270.

Step 480 includes communicating radio signals between the relay station and a base station using the second mode of operation. As shown in FIG. 5, the steps of method 400 may be performed in different order than that discussed immediately above. In the example shown, the loop from step 420 through step 440 may be performed each time step 470 is performed. As another example, the loop from 420 through step 440 may be performed only upon initial deployment of network 200 (e.g., after performing step 410).

Some of the steps illustrated in FIG. 6 may be combined, modified or deleted where appropriate, and additional steps may also be added to the flowchart. Additionally, steps may be performed in any suitable order without departing from the scope of the invention. For example, in particular embodiments, relay station 300 may receive radio signals from base station 210 before communicating with endpoint 270. As another example, both the first and second access stations may be relay stations.

While various implementations and features are discussed with respect to multiple embodiments, it should be understood that such implementations and features may be combined in various embodiments. For example, features and functionality discussed with respect to a particular figure, such as FIG. 2, may be used in connection with features and functionality discussed with respect to another such figure, such as FIG. 1, according to operational needs or desires.

Although particular embodiments have been described in detail, it should be understood that various other changes, substitutions, and alterations may be made hereto without departing from the spirit and scope of the present invention. For example, although an embodiment has been described with reference to a number of elements included within communication system 100 such as endpoints, base stations and relay stations, these elements may be combined, rearranged or positioned in order to accommodate particular routing architectures or needs. In addition, any of these elements may be provided as separate external components to communication system 100 or each other where appropriate. The present invention contemplates great flexibility in the arrangement of these elements as well as their internal components.

Numerous other changes, substitutions, variations, alterations and modifications may be ascertained by those skilled in the art and it is intended that the present invention encompass all such changes, substitutions, variations, alterations and modifications as falling within the spirit and scope of the appended claims.

What is claimed is:

1. A relay station for use in a relay network, the relay station comprising:
   an antenna with a plurality of prongs;
   a radio configured to transmit and receive radio signals using the antenna;
   an electronic circuit configured to select between a first mode of operation for the antenna and a second mode of operation for the antenna, wherein the first mode of operation of the antenna includes an omni-directional mode of operation and the second mode of operation includes a directional mode of operation; and
   a processor operable to:
      determine a value for a wireless quality parameter of a link between a base station and the relay station using each of the plurality of prongs;
      compare the values for each link associated with each of the plurality of prongs to determine which provides the best value; and
      control the electronic circuit to use the prong providing the best value during the second mode of operation.

2. A relay station according to claim 1, wherein the wireless quality parameter is effective spectrum efficiency.

3. A relay station according to claim 1, wherein the wireless quality parameter is a received signal strength indicator.

4. A relay station according to claim 1, wherein the wireless quality parameter is a Carrier to Interference-plus-Noise Ratio.

5. A relay station according to claim 1, wherein the antenna includes four prongs.

6. A relay station according to claim 1, wherein the first mode of operation of the antenna is used to transmit and receive radio signals with a mobile station.

7. A multi-hop relay network comprising:
   a fixed station;
   an endpoint configured for wireless communication with the fixed station; and
   a relay station configured to transmit wireless communication between the fixed station and the endpoint, the relay station comprising:
      an antenna with a plurality of prongs;
      a radio configured to transmit and receive radio signals using the antenna;
      an electronic circuit configured to select between a first mode of operation for the antenna and a second mode of operation for the antenna; and
      a processor operable to:
         determine a value for a wireless quality parameter of a link between the fixed station and the relay station using each of the plurality of prongs;
         compare the values for each link associated with each of the plurality of prongs to determine which provides the best value; and
         control the electronic circuit to use the prong providing the best value during the second mode of operation;
      wherein the first mode of operation of the antenna includes an omni-directional mode of operation and the second mode of operation includes a directional mode of operation.

8. A relay station according to claim 7, wherein the wireless quality parameter is effective spectrum efficiency.

9. A relay station according to claim 7, wherein the wireless quality parameter is a received signal strength indicator.

10. A relay station according to claim 7, wherein the wireless quality parameter is a Carrier to Interference-plus-Noise Ratio.

11. A relay station according to claim 7, wherein the antenna includes four prongs.

12. A relay station according to claim 7, wherein the first mode of operation of the antenna is used to transmit and receive radio signals with the mobile station.

13. A method for operation of a relay station in a multi-hop relay network, the method comprising:
   selecting a first mode of operation for an antenna having a plurality of prongs, the first mode of operation including an omni-directional mode of operation;
   communicating radio signals between the relay station and an endpoint using the first mode of operation;
   selecting a second mode of operation for the antenna, the second mode of operation including a directional mode of operation; and
   communicating radio signals between the relay station and a fixed station using the second mode of operation, wherein communicating the radio signals comprises:
      determining a value for a wireless quality parameter of a link between the fixed station and the relay station using each of the plurality of prongs;

compare the values for each link associated with each of the plurality of prongs to determine which provides the best value; and control the electronic circuit to use the prong providing the best value during the second mode of operation.

14. A method according to claim 13, wherein the wireless quality parameter is effective spectrum efficiency.

15. A method according to claim 13, wherein the wireless quality parameter is a received signal strength indicator.

16. A method according to claim 13, wherein the wireless quality parameter is a Carrier to Interference-plus-Noise Ratio.

* * * * *